United States Patent
Templain

(10) Patent No.: US 10,803,072 B2
(45) Date of Patent: Oct. 13, 2020

(54) SYSTEMS AND METHODS FOR RETRIEVAL AND QUALIFICATION OF DATA ITEMS AND ENTITIES IN SUPPORT OF RETAIL TRANSACTIONS

(71) Applicant: Mark Templain, Niagara Falls (CA)

(72) Inventor: Mark Templain, Niagara Falls (CA)

(*) Notice: Subject to any disclaimer, the term of this patent is extended or adjusted under 35 U.S.C. 154(b) by 242 days.

(21) Appl. No.: 15/752,421

(22) PCT Filed: Aug. 19, 2016

(86) PCT No.: PCT/CA2016/050976
§ 371 (c)(1),
(2) Date: Feb. 13, 2018

(87) PCT Pub. No.: WO2017/027979
PCT Pub. Date: Feb. 23, 2017

(65) Prior Publication Data
US 2019/0012318 A1    Jan. 10, 2019

Related U.S. Application Data

(60) Provisional application No. 62/206,870, filed on Aug. 19, 2015.

(51) Int. Cl.
*G06F 16/248* (2019.01)
*G06F 16/2457* (2019.01)
*G06Q 40/02* (2012.01)
*G06Q 30/06* (2012.01)
*G06F 16/242* (2019.01)

(52) U.S. Cl.
CPC ...... *G06F 16/24578* (2019.01); *G06F 16/248* (2019.01); *G06F 16/2428* (2019.01); *G06Q 30/06* (2013.01); *G06Q 40/025* (2013.01)

(58) Field of Classification Search
None
See application file for complete search history.

(56) References Cited

U.S. PATENT DOCUMENTS

| | | | |
|---|---|---|---|
| 2008/0183616 A1 | 7/2008 | Hankey | |
| 2011/0173116 A1* | 7/2011 | Yan | G06Q 10/067 705/38 |
| 2012/0330719 A1* | 12/2012 | Malaviya | G06Q 30/02 705/7.31 |

(Continued)

*Primary Examiner* — Wilson Lee
(74) *Attorney, Agent, or Firm* — Jenna L. Wilson; Wilson Lue LLP

(57) ABSTRACT

A method and system for identifying assets in support of a transaction includes obtaining a set of filter values for a customer from each of a plurality of filtering entities. The filtering entities may provide rules, which may be executed in a distributed manner by remote systems, that generate filter values based on input data, or that generate customized filter rules based on the input data. Filter values are used to filter search results produced by a query of a database of assets. Where customized filter rules are generated, the rules are executed against the characteristics of the assets identified in response to the query in order to produce filter values, and the filter values are then used to filter the search results. The search results can be ranked according to a ranking value generated in advance of filtering in order to rank the assets in order of suitability.

17 Claims, 11 Drawing Sheets

(56) References Cited

U.S. PATENT DOCUMENTS

2014/0067586 A1* 3/2014 Geisen .............. G06Q 30/0611
                                                      705/26.4
2015/0178809 A1   6/2015 Scopazzi
2016/0037197 A1* 2/2016 Kitts ................ H04N 21/25883
                                                      725/35

* cited by examiner

SYSTEMS AND METHODS FOR RETRIEVAL AND QUALIFICATION OF DATA ITEMS AND ENTITIES IN SUPPORT OF RETAIL TRANSACTIONS

CROSS-REFERENCE TO RELATED APPLICATIONS

This application claims priority to U.S. Provisional Application No. 62/206,870 filed Aug. 19, 2015, the entirety of which is incorporated herein by reference.

BACKGROUND

1. Technical Field

The present disclosure relates to systems and methods for data processing, retrieval, and ranking of data records in support of a transaction.

2. Description of the Related Art

In retail industries in which transactions are supported by financing, the effectiveness of the vendor's sale process can be hampered by the customer's eligibility to purchase an asset or the vendor's inability to source appropriate financing resources for the customer. For example, in the vehicle retail industry, many customers desire or require a loan to purchase a new or used vehicle; however, in conventional vehicle retail sales, the determination of the customer's eligibility for additional financing to cover the difference between the customer's cash in hand (i.e., what the customer can pay without securing the additional financing, whether in cash or another form) and/or value of the customer's trade-in vehicle, if any, occurs after the customer has test-driven a vehicle and selected a vehicle for purchase. If the customer does not qualify for the needed loan, the dealer is at risk of not closing a deal at all. However, simply pre-qualifying a customer for a particular loan amount does not necessarily address this problem.

BRIEF DESCRIPTION OF THE DRAWINGS

In drawings which illustrate by way of example only embodiments of the present application.

FIG. 10 is a flowchart of a query, retrieval, and sorting process executed by the deal processing system.

DETAILED DESCRIPTION

Figure 1:
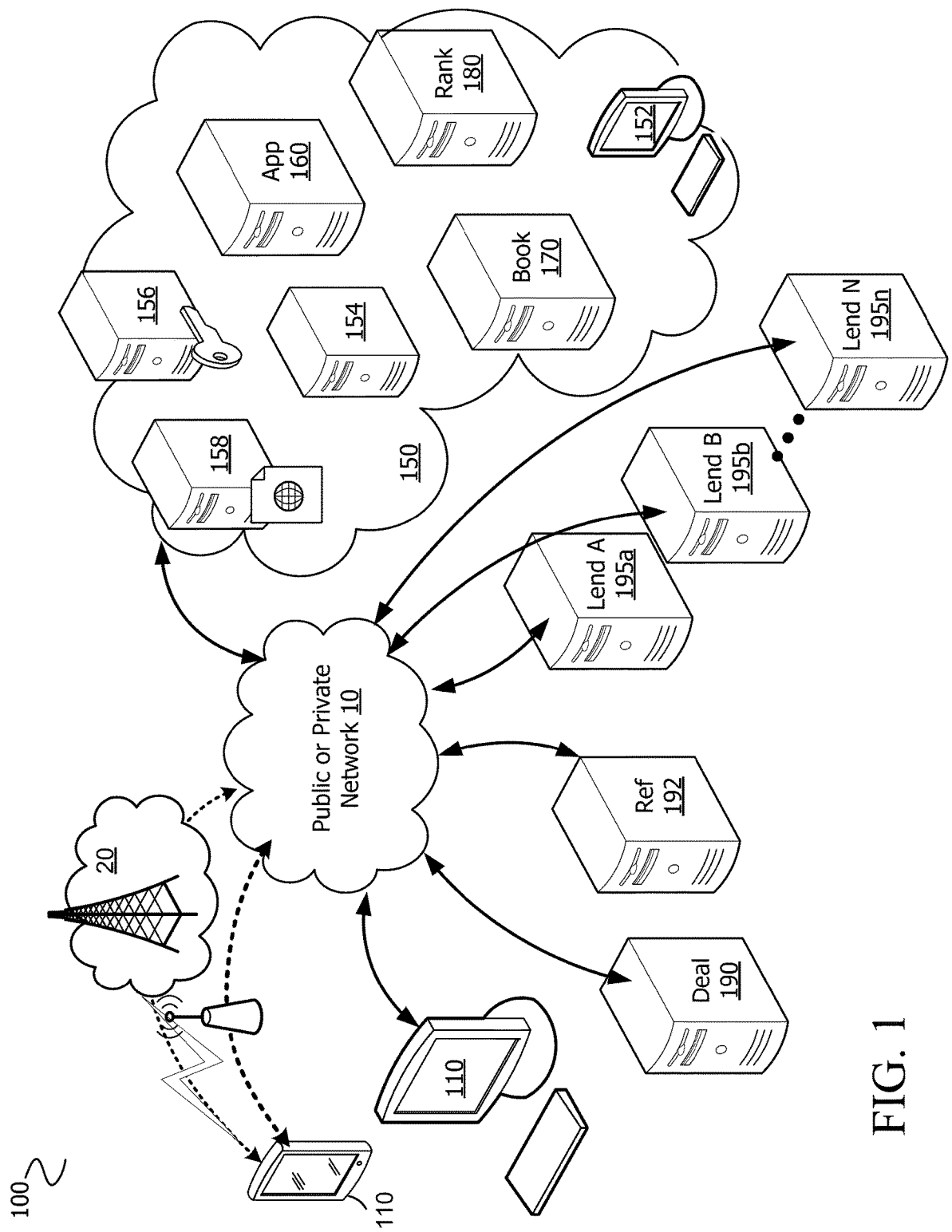
FIG. 1 is a schematic of an example data processing environment comprising client and server systems, including a deal processing system suitable for use with the systems and methods described herein.

The prior art process of constructing and closing deals involving the sale and financing of major assets, such as motor vehicles, is a multiple-step process that starts with the identification of a desired asset for purchase; determination of the customer's potential creditworthiness and available financing (which may be provisionally assessed prior to identification of the asset); qualification of the customer for any desired or required financing; and the actual closing of the deal, which includes the preparation and execution of loan and purchase documentation. As those skilled in the art will appreciate, even without taking into account any time spent on negotiation between the vendor and customer, the process can take some time, and potentially days, to complete; the process may also be viewed as inconvenient or intrusive to the customer, since qualification for financing requires the customer to disclose personal and financial information, perhaps multiple times in order to seek loan approval from multiple lenders or for different assets.

Failures in such deals involving financing-particularly in the retail vehicle trade—can be due to the customer's ineligibility for vehicle financing. This can be due to the booking value of the desired vehicle (typically defined as the Black Book bank loan value multiplied by an acceptable multiplier for a given lending program) being insufficient to cover the retail value of vehicle without a down payment, which the customer may not be able to afford. If a trade-in vehicle with negative equity is attached to the deal, this may be an aggravating factor. As a result, searches for suitable vehicles for a given customer—whether conducted by the customer and dealer on the lot, or online—can be inefficient, as the conventional search process involves selection of a vehicle followed by assessment of the customer's creditworthiness, approval, and finally closing of the deal.

Furthermore, vendors may engage in a "shotgun" approach when sourcing lenders for a particular customer, in which the vendors indiscriminately submit a customer's credit application to any available lenders the vendor knows of, without taking into consideration the lender's particular criteria for credit approval. This can result in wasted resources on the part of the vendor and lenders; some lenders will process and approve the application, only to have the deal go to another one of the many lenders to which the application was submitted, while other lenders will spend resources reviewing an application for a customer that does not fit its criteria. Some lenders may decline to review an application that was previously sent to other lenders. In addition to this, repeated credit inquiries made by the lenders of consumer credit reporting agencies may cause a temporary decrease in the customer's credit score. And, after potentially several days of attempting to construct a deal, the ultimate result may be no deal at all if no lender is willing to provide financing. The customer may be discouraged from re-initiating the process to attempt to purchase another vehicle due to the time and inconvenience involved.

While the customer's solvency and current cash position are beyond the control of vendors and lenders, some of the delays and inconveniences of the typical deal process can be mitigated by more efficient handling of data involved in the transaction, and improvements in the identification of potential lenders. Accordingly, the systems and methods described herein provide solutions for improving the overall efficiency of the deal process.

The embodiments and examples described herein are generally illustrated in the context of a data processing environment comprising one or more data processing systems, which may operate over a local or wide-area network. FIGS. 1-6 illustrate select components of data processing devices or systems that are suitable for use in the contemplated data processing environment.

FIG. 1 illustrates an example data processing and networking environment 100, including client data processing systems 110 and various other participant data processing systems (which may themselves comprise networked arrangements of computing devices) 150, 190, 192, and 195a-n. As discussed below, system 150 comprises a deal processing system; system 190 is a dealer data processing system which may supply data to the deal processing system 150 (or may, in some implementations, comprise client systems 110); system 192 is a reference system that may supply data to the deal processing system 150; and systems 195a-n comprise lender data processing systems, which either supply filter rules to the deal processing system 150 or execute filtering operations for the deal processing system 150. Systems 190, 192, 195a-n are typically, but not necessarily, operated by distinct entities than the entity operating the deal processing system 150. It is possible, however, that a dealer operating a dealer system 190 may also operate the deal processing system 150. FIG. 1 illustrates but one possible network topology for use in the environment 100, and is by no means intended to be limiting.

In this example, the various systems 110, 150, 190, 192, and 195a-n communicate with each other as required over a wide area network 10, such as the Internet. Similarly, other data processing systems in FIG. 1 that comprise networked arrangements of computing devices may employ the same network 10 for their own communications (not illustrated), although other public or private, fixed or wireless local area networks or other communications arrangements may be employed. The network 10 need not be the Internet, or a wide area network; the network 10 may be public or private, wide or local, fixed or wireless. It is expected that a common implementation will be over the Internet or a wide area network with the client systems 110 utilizing a web browser or similar client application to directly or indirectly access services supplied by other components of the environment 100, in view of the current popularity of hosted services supplied over the Internet (e.g., "cloud"-based services). Some or all of the systems 110, 150, 190, 192, and 195a-n may access the network 10 over a wireless network and gateway 20. However, this is by no means the only implementation possible, or the only implementation contemplated herein. In many examples, the client systems and the server systems may be physically and geographically removed from one another. In other examples, two or more of the systems may be provided at the same physical location, for instance in communication over a local area network. Either way, these systems may be considered either physically or logically "remote" from one another.

Figure 2:
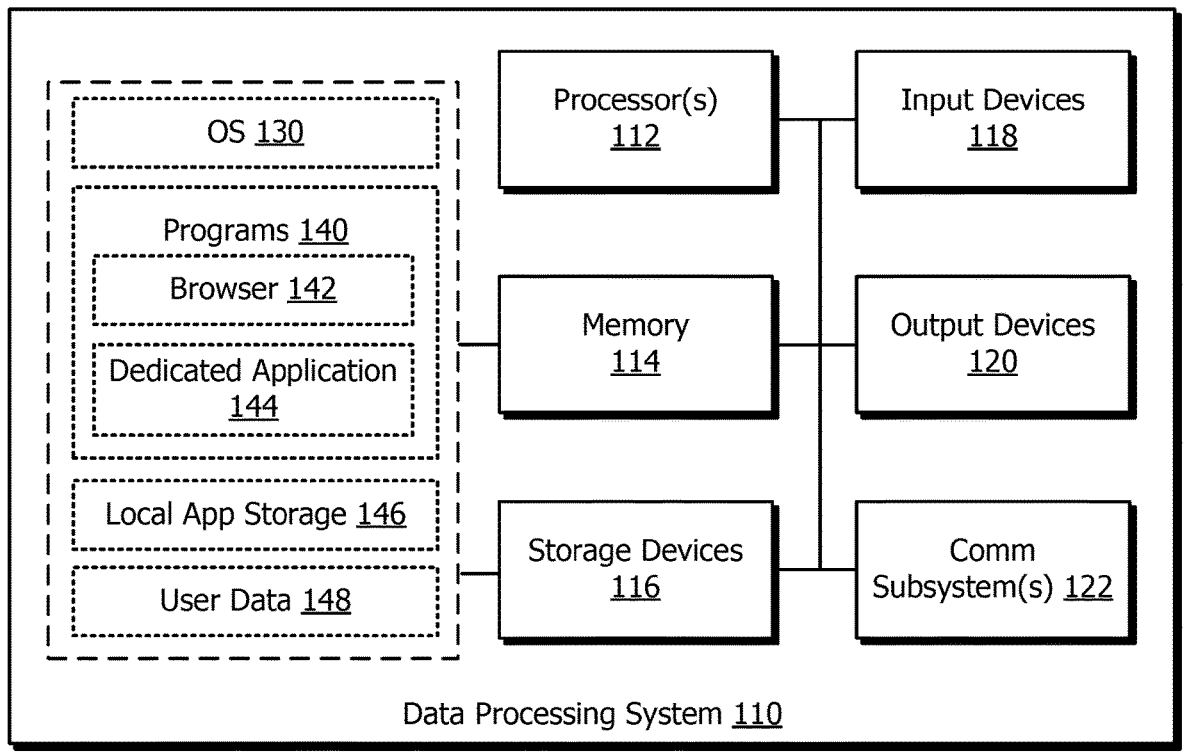
FIG. 2 is a schematic of select components of a client computing system for use in the environment of FIG. 1.

FIG. 2 is a block diagram of select components of an example client data processing system 110 as may be used by an operator or individual accessing the environment 100. The client system 100 may be embodied in a single device, such as a desktop computer, workstation or terminal, mobile computer (e.g., laptop computer, tablet computer, or smartphone). While the example system 110 is illustrated herein as a desktop computer or mobile device, it will be appreciated by those skilled in the art that this is not intended to be limiting, and the solutions described herein may be implemented on any suitable data processing device that is configurable to operate as described, whether or not this device is primarily intended for productivity uses or other types of uses.

Operation of the system 110 is generally controlled by a main processor or processors 112. The system 110 may be operated under mains power or may be a battery-powered device; these features are not illustrated in FIG. 2 for ease of exposition. Data, programs, and other instructions or information can be stored in one of several possible memory components of the system 110, such as internal memory 114 (which can include standard volatile and non-volatile memory components, which can be integrated with other components such as the processor 112 or provided as distinct components). Information can also be stored in the system 110 on other storage devices, either internal or external, such as hard drives, flash drives, memory cards, and peripheral devices, not shown in FIG. 2. Typically, software and data components such as the operating system (OS) 130, programs (applications) 140, application data 146, and user data 148 are stored in resident persistent memory. In some systems 110, some components of the OS 130 may be embedded as firmware in integrated memory in the processor 112. However, portions of such components may be temporarily loaded into volatile memory. In this example, the programs 140 can include, among various applications that may be installed during initial configuration by the manufacturer or distributor of the system 110, or after receipt by the user or an administrator, a general purpose user agent such as a web browser application 142 or a dedicated program 144. Either the browser 142 or the dedicated program 144 may be used to implement the client operation described here. Programs 140 and data 146, 148 can be stored in persistent memory of the data processing system 110, as mentioned above. The data may be stored on a storage device 116, or may be stored volatile memory instead.

The data processing system 110 is provided with user or sensor input devices 118. User input devices can include a touch and/or pointing device, such as a touchscreen, touchpad, mouse, or trackball; a keyboard; security peripherals such as a biometric scanner; and multimedia input devices, such as cameras or microphones. The system 110 may also have environmental or contextual input devices such as an orientation or inertial navigation sensor (particularly in the case of a touchscreen device), ambient light sensor, or a global positioning system (GPS) or other location detection module. The system 110 can also include one or more output devices 120, including in particular a display screen, which may be integrated in the chassis of the data processing system 110, or else provided as a peripheral device. The system 110 may be configured to output data to an external monitor or panel, tablet, television screen, projector, or virtual retinal display, via a data port or transmitter, such as a Bluetooth® transceiver, USB port, HDMI port, DVI port, and the like. The data port or transmitter may be one of the communication subsystems 122 illustrated in FIG. 2. Graphics data to be delivered to the display screen is either processed by the processor 112, or else by a dedicated graphics processing unit, not included in FIG. 2. Other output devices include speakers, and haptics modules. Not all of these suggested input or output devices are required, and many may be omitted. For instance, where the primary user interface of the system 110 is a touchscreen, a physical keyboard may be omitted altogether.

Communication functions, including data and optionally voice communications, are performed through one or more communication subsystems 122 in communication with the processor 112. Other functional components used to accomplish communication functions, such as antennae, decoders, oscillators, digital signal processors, and the like, may be considered to be part of these subsystems. Wireless communication subsystems are used to exchange data with wireless networks or other wireless devices in accordance with one or more wireless communications standards. New wireless standards are still being defined, but it is believed that they will have similarities to any network or communication behavior described herein, and the examples described here are intended to be used with any suitable standards that are developed in the future. The wireless link connecting the communication subsystems may operate over one or more different radiofrequency (RF) channels according to defined protocols, such as wireless LAN (e.g., one or more of the 802.11™ family of standards), near-field communication, Bluetooth® and the like. The particular design of a communication subsystem is dependent on the communication network 10 with which it is intended to operate. The communication subsystems 122 may include adaptors for use with wired connections as well.

It will be understood by those skilled in the art that the components illustrated in FIG. 2 are merely representative of particular aspects of the system 110, and that other components that are typically included in such a device have been excluded in the drawings and this description only for succinctness. Furthermore, those skilled in the art will understand that the system 110 may be successfully used with the various examples described herein even when some components described in relation to FIG. 2 are omitted.

Figure 3:
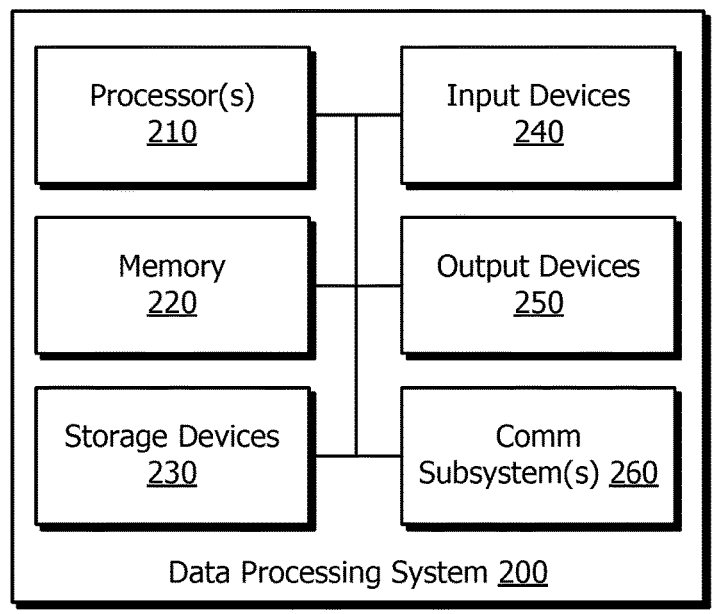
FIG. 3 is a schematic of select components of a server computing system for use in the environment of FIG. 1.
Figure 4:
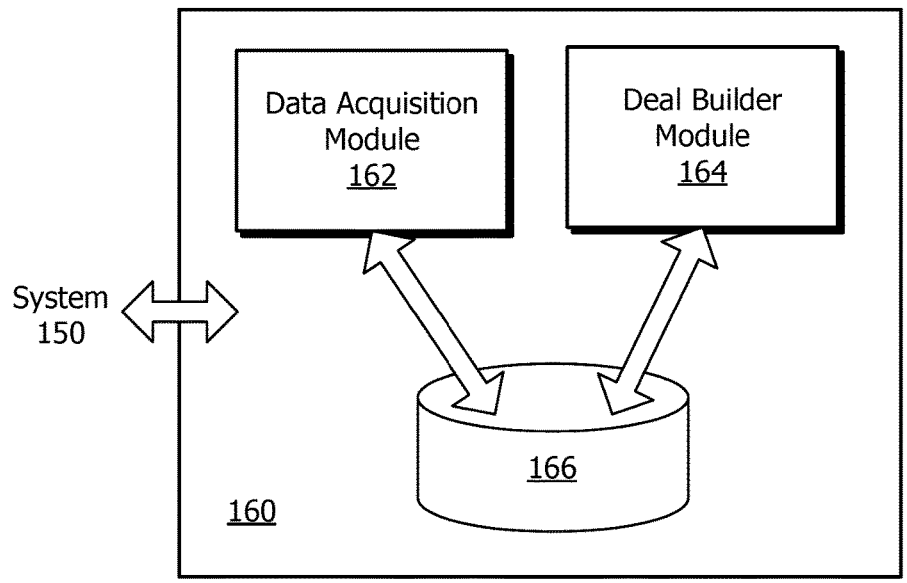
FIG. 4 is a schematic of select components of an application module of the deal processing system of FIG. 1.
Figure 5:
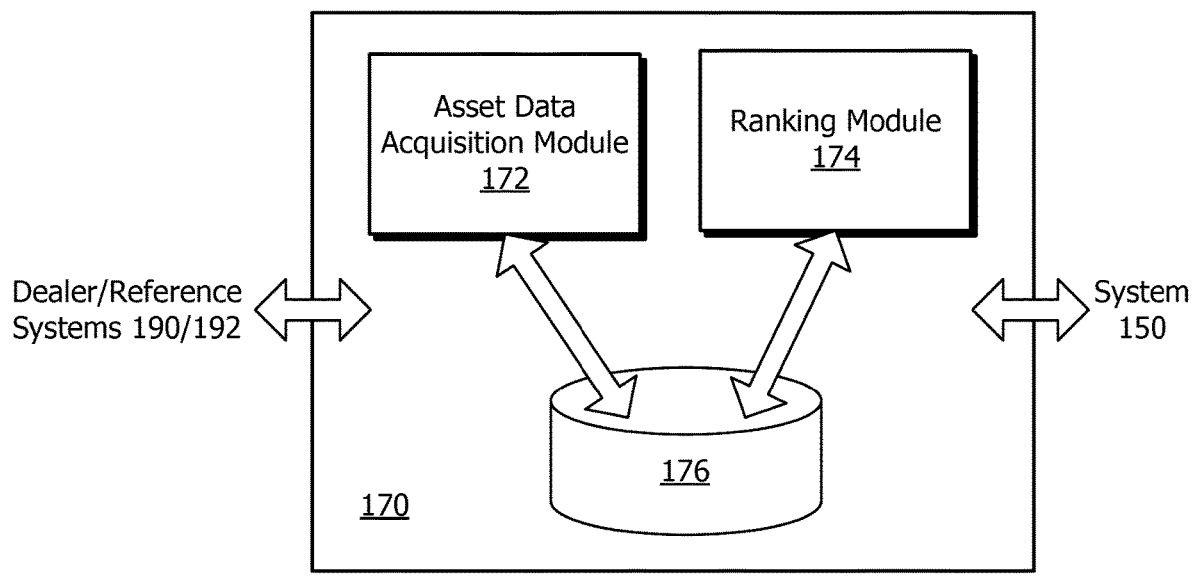
FIG. 5 is a schematic of select modules of a booking module of the deal processing system of FIG. 1.
Figure 6:
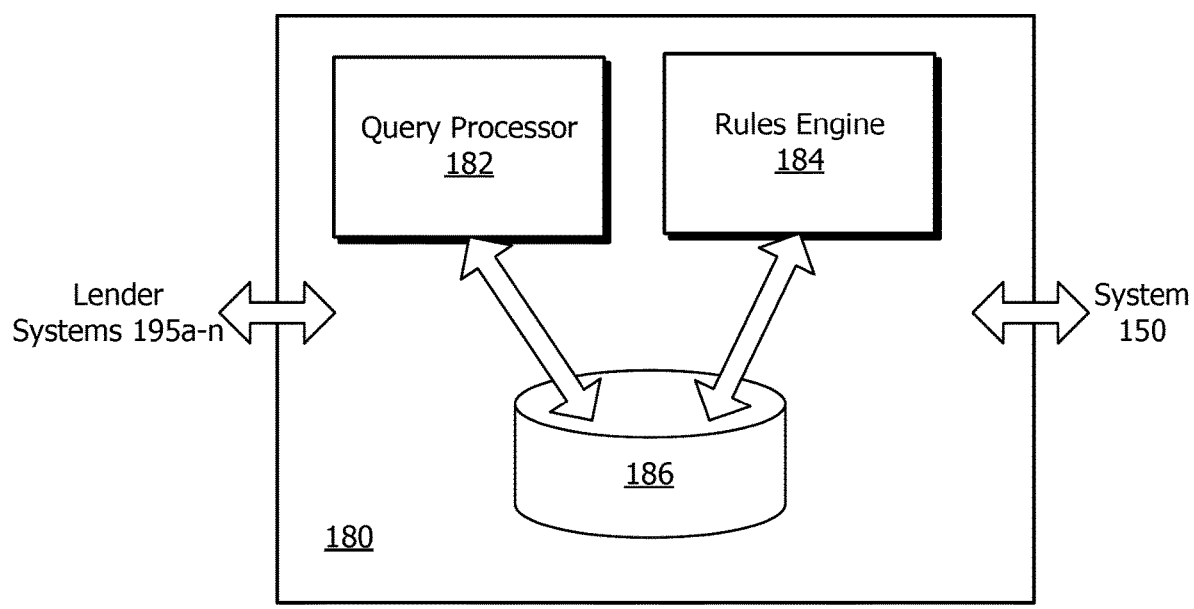
FIG. 6 is a schematic of select modules of a filtering module of the deal processing system of FIG. 1.

FIG. 3 illustrates select components of a server data processing system 200 as may be implemented in server systems used in data processing systems 150, 190, 192, and 195a-n of FIG. 1. Again, it will be appreciated by those skilled in the art that these components are merely representative, and that some of these components may be omitted or substituted while still achieving successful operation of the embodiments and examples described herein. In FIG. 3, components similar to those of the client data processing system 100 are illustrated, including one or more processors 210, memory 220, storage devices 230, input and output devices 240, 250 respectively, and communication subsystems 260. The appropriate selection of components for a server system 200 will be known to those skilled in the art. While the server system 200 may include local storage devices 230, data processed or managed by the server may be stored remotely from the server system 200, for example on a file server, not illustrated. Any server system 200 may comprise a plurality of physical computing devices.

Briefly, with reference to FIGS. 1 and 4-6, the deal processing system 150 includes an application module 160, a booking module 170, and a filtering module 180. The application module 160 collects customer application data from a customer or vendor at a client system 110 (or dealer system 190, because the vendor may be a dealer) using a data acquisition module 162, and stores the data in a secure customer application data repository 166. Customer application data may also be collected by the application module 160 from a third party source, such as credit information from one or more credit reporting agencies, although such data may be obtained from the client system 110 or dealer system 190 if the information was previously acquired by or for the customer. If the application module 160 transmits a request for credit information to a third party, the request may include data indicating customer consent to collect the information (e.g., a digital signature or authorization obtained from the client, data acquired from customer identification such a driver's licence, etc.) The application module 160 may communicate with either the booking module 170, the filtering module 180, or both, to provide the customer application data for use by these other modules 170, 180. The application module 160 may also include a deal builder module 164 for generating forms and/or other documentation for completing a transaction between a customer and a lender and/or vendor. Optionally, completion of the transaction may be handled electronically, with documentation presented electronically (e.g., onscreen) for the customer's review and electronic signature. The documentation may be stored electronically as well, and transmitted to all transaction participants electronically (e.g., by email). The booking module 170 comprises a ranking module 174 that uses customer information and lender filtering information (which may be provided by the filtering module 180), as well as stored data relating to asset values, to rank or sort available assets for a given customer. To this end, the booking module 170 comprises a data acquisition module 172 for acquiring asset value data from dealer and/or reference systems 190, 195. Acquired data is stored in data repository 176. The filtering module 180 includes a query processor 182 for initiating filtering operations based on customer data received from the application module 160. Filtering operations can comprise execution of sets of rules stored in ruleset repository 186 by the rules engine 184, or by the query processor 182 transmitting a request for distributed filtering by a lender data processing system 195a-n.

The deal processing system 150 can also include other modules for providing other services required for implementing the customer data, booking, and filtering operations of modules 160, 170, and 180. As shown in FIG. 1, the deal processing system includes an administrator data processing system 152, a web server 158, a gateway 154, and an authentication server 156. The administrator data processing system 152 can be used by an administrator of the system 150 for the purpose of maintenance, upgrades, and so forth; as illustrated here the administrator 152 is within the same local network as other components such as systems 160, 170, and 180, but in other implementations the administrator may access the system 150 from a remote client system 110. The gateway 154 and authentication server 156 control access over the network by users and the public in accordance with security protocols implemented for the system 150. The web server 158 provides a communication interface between the modules of the deal processing system 150 and client systems 110, and optionally with other systems such as the dealer, reference, and lender systems 190, 192, 195a-n.

While modules or systems 152, 154, 156, 158, 160, 170, and 180 are depicted as separate systems within the deal processing system 150 (e.g., implemented on separate data processing systems 200 and with different data repositories), it will be appreciated by those skilled in the art that in some implementations the various functions or data storage components of these modules or systems may be combined or allocated to different data processing systems within the deal processing system 150. For example, the deal building module 164 may be integrated into the booking module 170, or some or all of the functions of the booking module 170 and filtering module 180 may be combined into a single component within the deal processing system 150. Further, while various modules are illustrated schematically in the figures as single computing devices, the various components and functions of these systems can be distributed across multiple servers and devices. It will also be appreciated that the accompanying figures only illustrate select components of the various systems 150, 190, 192, 195a-n. For example, additional communications interfaces or security modules may be implemented in individual modules 160, 170, 180 in the deal processing system 150, particularly where systems external to the deal processing system 150 are permitted to communicate with those modules 160, 170, 180 without employing the web server 158, authentication server 156, etc. of the system 150.

The deal processing system 150 permits a customer or a vendor to search for available assets for purchase, and provides for efficient identification of assets suitable for purchase by a given customer. Unlike conventional search interfaces, results of searches are not identified simply according to price, or the degree to which the identified assets correspond to the customer's specified features (such as make, model, or colour of a motor vehicle). Instead, assets are identified according to one or more filter values associated with the customer's ability to afford the asset, taking into account available financing and asset trade-ins, if applicable, and ranked according to criteria other than absolute asking price for the asset. In this manner, the search results are restricted to those for which the customer is likely to be able to close a deal, avoiding the need for repeated searching and consumption of computing resources on the part of the customer, vendor, and lender alike to locate an asset for purchase and qualify the customer for a loan. The filter system 180 identifies one or more lenders for a given customer that can be ranked according to suitability or other preferences, and permits for distributed filtering of lenders for a given customer. In brief, the deal processing system 150 facilitates the completion of a transaction by implementing an efficient search, filtering, and ranking process for identifying an asset to be purchased, and at least one lender suitable for both the asset and the customer.

In the example described herein, the asset for purchase is a motor vehicle, although it will be understood that this is not intended to be limiting. Initially, the data repository 176 of the booking module 170 is populated with data describing the assets available for purchase. The acquisition of data for use by the booking module 170 is described with reference to FIG. 7. The data repository 176 may be populated automatically over the network 10 using data sources such as the dealer systems 190 and reference systems 192. In this vehicle example, a reference system 192 may be a data source that provides aggregated reference vehicle price values (e.g. average retail prices, wholesale prices, reference bank loan values, etc.) for a range of vehicle makes, models, and conditions. Examples of currently published sources of such information include the National Automobile Dealers Association (NADA) guide, Kelley Blue Book, or Black Book. Other reference vehicle data sources may be used.

To populate the data repository 176, the booking module 170 receives data originating from one or more sources correlating a library of vehicles to values such as a wholesale price value bank loan value and a retail price value. Initially, the booking module 170 may be populated with records for a number of vehicles of various types (e.g., make, model, year, and optionally other features) and conditions (e.g., rough, average, clean, extra-clean) based on the Black Book, NADA guide, and/or Blue Book. Retail, wholesale, and bank loan values are then obtained for each vehicle in the library, either by manual entry or by automated requests and aggregation of data. For example, the wholesale and bank loan values may be loaded from an electronic source of price values such as the aforementioned Black Book. Given that the library of vehicles in the data repository 176 can include records for vehicles in different conditions and not only front-line vehicles, it is preferable that the wholesale values and bank loan values are determined at least in part by vehicle condition.

Retail price values can be obtained from the same reference sources 192, or else from inventory databases or online sales databases of dealer systems 190. In one implementation in which the retail values are obtained from dealer systems 190, a separate record may be created for each distinct vehicle listed in dealer inventory, with the individual dealer's listed retail price value. Consequently, there can be records for multiple vehicles of similar make, model, year, and condition. Each record can also include a uniform resource indicator (URI) for the individual dealer (for instance, if the vehicle information is available online), or an address and/or other contact information for the dealer. Table 1 illustrates example content of records for a plurality of vehicles populated in this manner. The tabular form presented below does not necessarily represent the data structure in which the vehicle data is stored:

TABLE 1

| Make | Model | Year | Characteristics | Retail Value | Bank Loan Value | Vehicle URI |
| --- | --- | --- | --- | --- | --- | --- |
| <make 1> | <model 1> | <year 1> | <char_set 1> | <price 1> | <bl 1> | <URI 1> |
| <make 2> | <model 2> | <year 2> | <char_set 2> | <price 2> | <bl 2> | <URI 2> |
| <make 3> | <model 3> | <year 3> | <char_set 3> | <price 3> | <bl 3> | <URI 3> |
| <make 4> | <model 4> | <year 4> | <char_set 4> | <price 4> | <bl 3> | <URI 4> |

In the above table, only retail value is illustrated as a field in each vehicle record; however, the wholesale value can be included as well. In another implementation, rather than creating a separate record for each individual, actual vehicle in dealer inventory, a separate record is created for distinct combinations of vehicle make, model, year, condition, etc. including one representative retail price value. The representative retail price value may be obtained from the reference system 192 as mentioned above, or else the retail values collected from dealer systems 190 are aggregated and represented by a single value. For instance, the mean of all retail values for similar vehicles (same make, model, year, condition) is calculated and stored as the "retail value" in a given record. In this implementation, URIs or other contact information for dealers actually having such vehicles in inventory may still be stored in the data repository 166 in association with that vehicle type.

Figure 7:
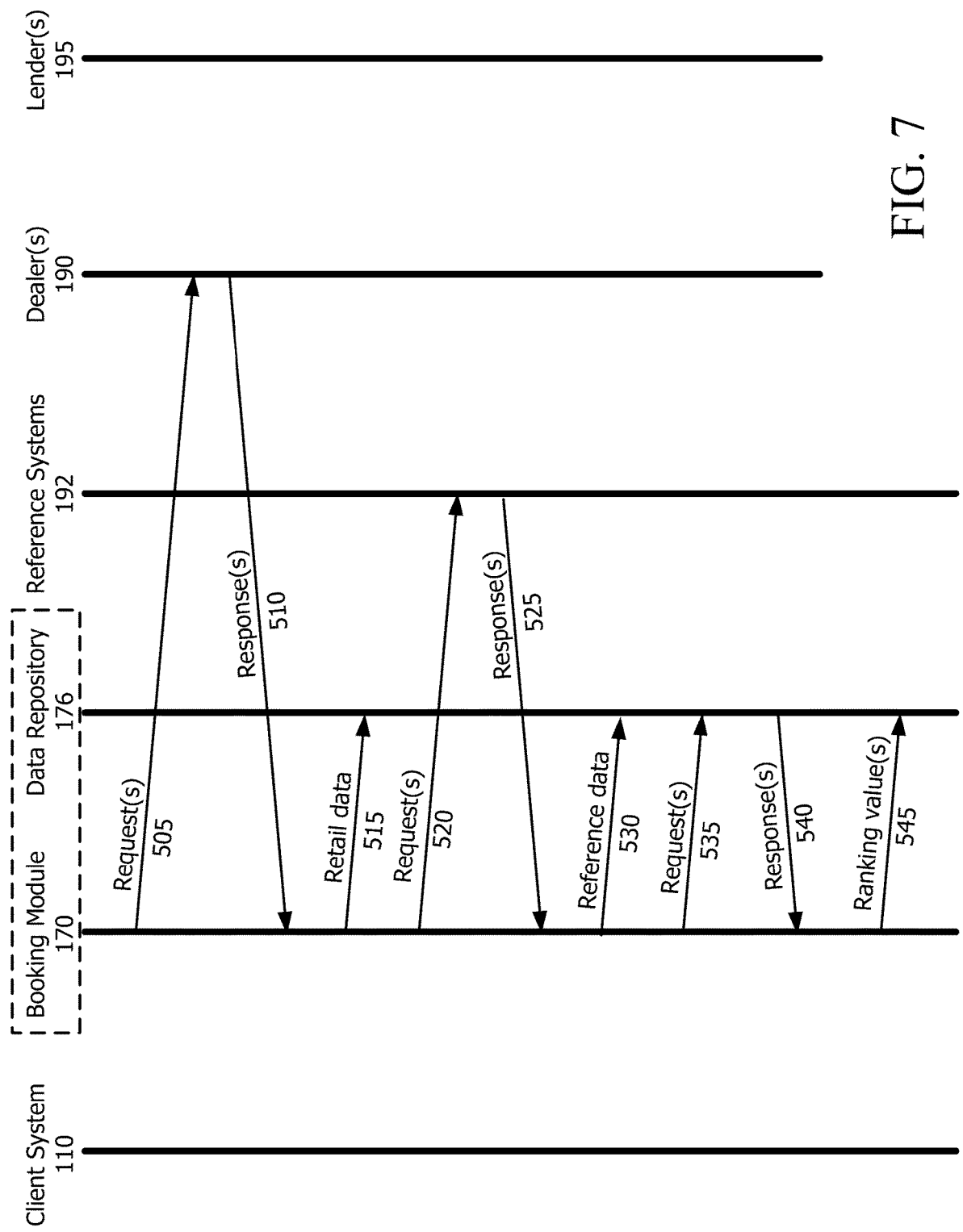
FIG. 7 is an interaction diagram illustrating data acquisition operations executed by the deal processing system.

In an implementation in which data is automatically accumulated from dealer systems 190 and reference systems 192, as illustrated in FIG. 7, the data acquisition module 172 of the booking module 170 initiates one or more requests 505 to one or more dealer systems 190 to retrieve data sets for a plurality of inventory objects, namely vehicles. The data retrieved by the corresponding one or more responses 510 includes makes and models of vehicles in inventory, as well as any characteristics available, such as year of manufacture, condition, mileage, and other features of the vehicle, and the retail price set by the dealer. In addition to this, data sets may be obtained from vehicle manufacturers as well, although the retail value may instead be a manufacturer's suggested retail value. As noted above, rather than storing records for each individual vehicle in dealer inventory, one record may be stored for each distinct vehicle type with a representative retail value.

This retrieved data, indicated as retail data in FIG. 7, is then sent to the data repository 166 for storage in one or more records as discussed above. The data acquisition module 172 of the booking module 170 further initiates one or more requests 520 for wholesale data and bank loan value data from one or more reference systems 192, and receives this data in one or more responses 525. This reference data is then sent 530 to the data repository 176 for storage in association with the corresponding records.

With the various price values entered in the data repository 176, ranking values may then be computed for each vehicle type or individual vehicle record. The ranking value is the booking value, or the difference between the bank loan value and either the retail value and the wholesale value, as may be selected by the booking system 170. These calculations may be carried out by the data acquisition module 172 of the booking system 170 as complete data is received for each vehicle record, or alternatively may be computed in bulk after the data repository 160 is populated with the values. In the example of FIG. 7, the ranking values are computed in bulk; the data repository 176 is queried as indicated by request 535 by the data acquisition module 172 for the bank loan and wholesale or retail values for each record. The module 172 then computes the ranking value in bulk, and stores 545 these ranking values with their associated records in the data repository 176.

Figure 8:
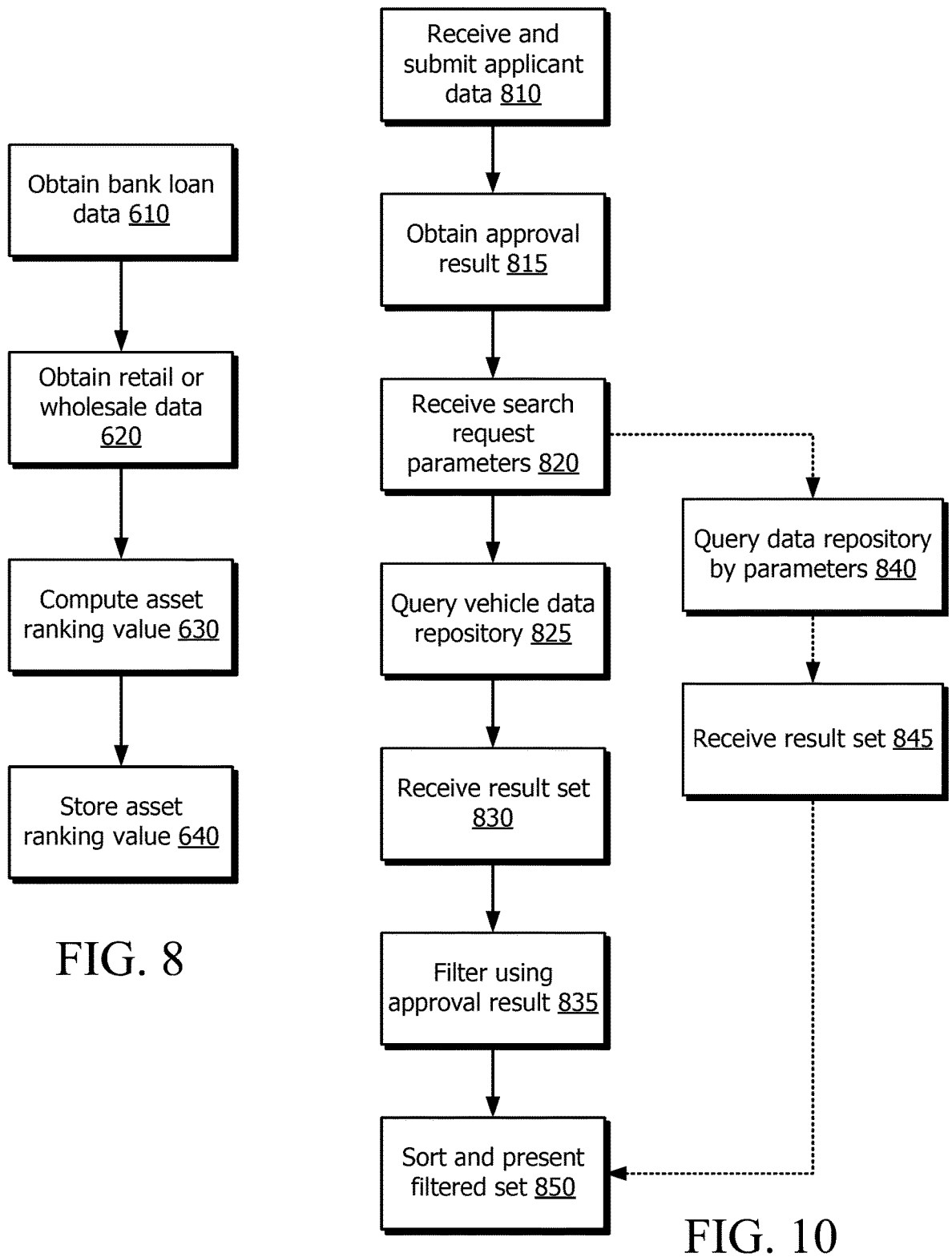
FIG. 8 is a flowchart of a data acquisition process executed by the deal processing system.

FIG. 8 illustrates this process: at 610, the bank loan value data for a vehicle is obtained, and at 620, the retail or wholesale value data is obtained, as discussed above. At 630, the ranking value is computed, and at 640 the ranking value is stored in the data repository 160. Table 2 illustrates example content of the records for a plurality of vehicles after storage of the ranking value:

The data stored in the data repository 176 can then be used for efficient retrieval of data items (i.e., vehicle records or parts thereof) in response to a user query. In other implementations, however, the ranking values are not stored in advance, but are computed using the retail or wholesale values and the bank loan value at the time the ranking value is requested for a particular customer. However, if the bank loan values are not stored in the data repository 176 with the retail and wholesale values, then additional queries of a reference system 192 may be necessary when those bank loan values are required by the booking module 170.

Figure 9:
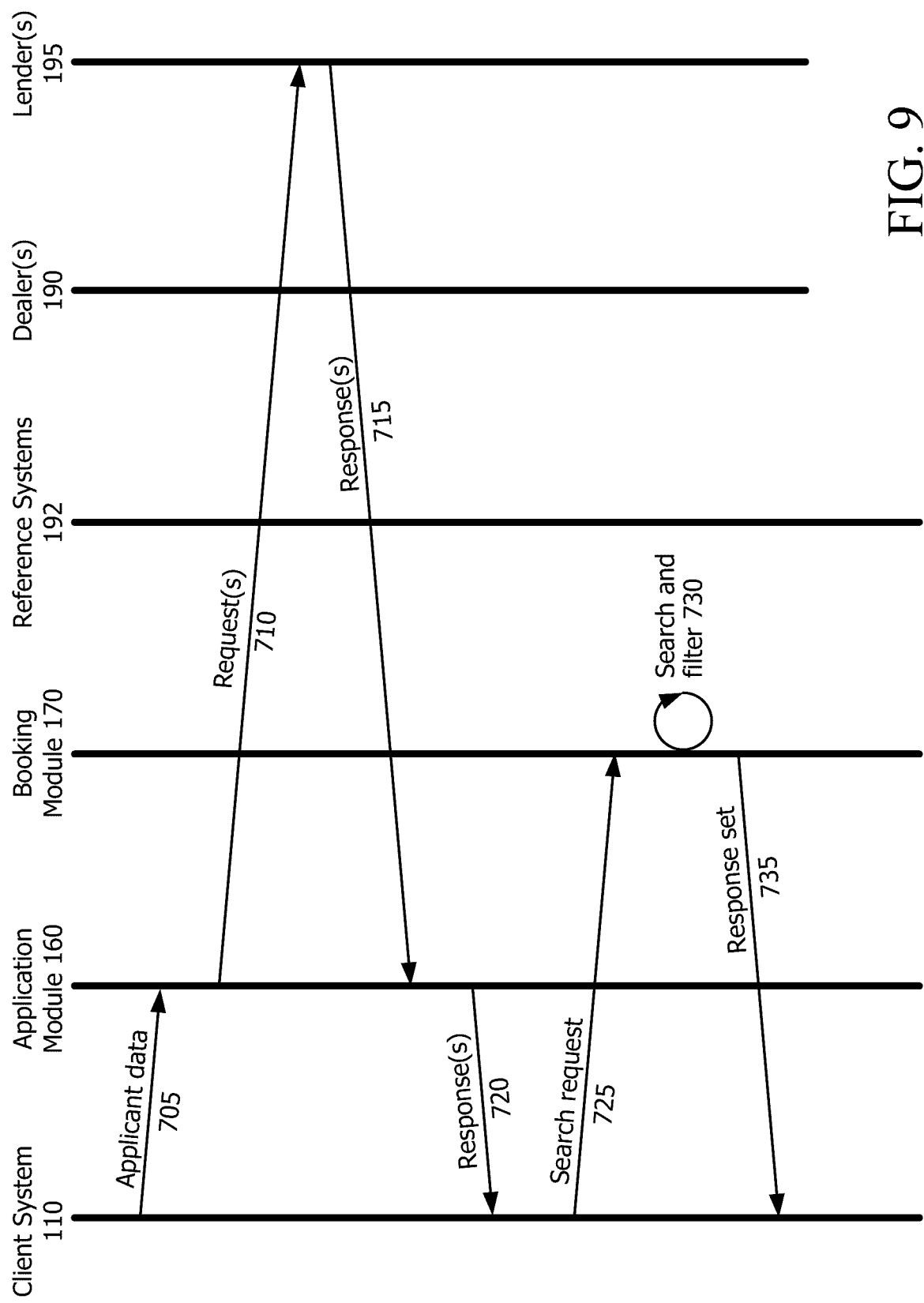
FIG. 9 is an interaction diagram illustrating data flow between various components in the environment of FIG. 1 during a simple search and filter operation.

FIGS. 9 and 10 illustrate operation of the deal processing system 150 in response to user queries in a simple implementation, in which the booking module 170 simply obtains a loan approval amount for a customer from at least one lender system 195. Turning first to FIG. 9, credit application data 705 for a customer is transmitted from the client system 110 to the application module 160. In these examples, the client system 110 may be located at the dealer system 190, and the client system 110 operated by a dealer acting as vendor; for simplicity only the client system 110 is referred to in these examples. The application data can include typical information that is generally required for the purpose of obtaining credit checks and loan approvals, and is preferably both stored and transmitted in encrypted form to protect the customer's privacy. In some implementations, certain data, such as customer contact information, addresses, etc. may be obtained using digital card readers or image processors that are configured to read the customer's identification cards (e.g., driver's licence). The application data is then transmitted in one or more requests 710 to a receiving lender system 195 to determine the customer's qualification for financing. Several requests 710 to multiple lender systems 195 may be transmitted at this stage. Responses 715 are received from the lender systems 195. These responses 715 would typically include an approval or denial of approval indicator, and a loan value representing the extent of credit approved for the customer. The approval information and loan value is transmitted in a response 720 to the client system 110.

Subsequently, a search request 725 is transmitted from the client system 110 to the booking module 170. As described above, the booking module 170 is comprised in the deal processing system 150, and external communication with the various components of the system 150 may be controlled by the web server 158 and other components of the system 150. For simplicity, in these examples communication between the client system 110 and specific modules such as booking module 170 is described; those skilled in the art will understand that such communication may not be direct, as the data exchanged between the module 170 (or other module) and the client system 110 may pass through, and

TABLE 2

| Make | Model | Year | Characteristics | Retail Value | Bank Loan Value | Vehicle URI | Ranking Value |
|---|---|---|---|---|---|---|---|
| \<make 1\> | \<model 1\> | \<year 1\> | \<char_set 1\> | \<price 1\> | \<bl 1\> | \<URI 1\> | \<val 1\> |
| \<make 2\> | \<model 2\> | \<year 2\> | \<char_set 2\> | \<price 2\> | \<bl 2\> | \<URI 2\> | \<val 2\> |
| \<make 3\> | \<model 3\> | \<year 3\> | \<char_set 3\> | \<price 3\> | \<bl 3\> | \<URI 3\> | \<val 3\> |
| \<make 4\> | \<model 4\> | \<year 4\> | \<char_set 4\> | \<price 4\> | \<bl 3\> | \<URI 4\> | \<val 4\> | may be modified, reformatted, encrypted, and so forth, by intermediate components of the deal processing system 150 or network 10.

The request 725 can include zero, one, or more criteria comprising keywords and/or values for a set of one or more parameters defining characteristics of vehicles. For instance, the parameters can include make, model, year, condition, and other characteristics such as the vehicle colour or optional extras installed in the vehicle, which are stored in the data repository 176. Other characteristics may also be stored in the data repository 176 and be made the subject of search criteria; for example, other characteristics can include vehicle features that may or may not be inherent in the make, model, or year of the vehicle, such as the number of seats, vehicle type (e.g. pick-up truck, minivan, sedan), colour, or after-market add-ons (e.g., audio and video systems). Where the client system 110 accesses the booking module 170 via a web browser, criteria may be input or selected in a user interface displayed at the client system in a web-based form and transmitted to the booking module 170 using any suitable communication process.

After receiving the query with optional parameters, the booking module 170 engages in a search and filtering process 730. The ranking module 174 queries the data repository 176 for vehicle records consistent with the parameters of the query. Information for each of the vehicle records matching the parameters are returned to the booking system 150 in a response set 735. The information returned to the ranking module 174 includes the ranking value for each matching record, which as discussed is previously computed and stored; however, if the ranking value is not stored, then additional queries to a reference system 192 may be required in order to obtain the required bank loan values for each vehicle record matching the parameters. This response set is then filtered by the ranking module 174 using the loan value received in the request 725, to eliminate those records in the result set having a bank loan value less than the loan value and produce a filtered set of information 735, which is transmitted back to the client system 110. The filtered set may be sorted by the ranking module 174 by ranking value, or by some other criterion, prior to transmission to the client system 110. The client system 110 can then display the information in the records of the filtered set to the user. In this manner, vehicles for which the customer is likely ineligible (in view of the loan value) are eliminated from the result set prior to delivery to the client system 110, thereby reducing the volume of data required to be transmitted to the client system 110 and the number of potential matching vehicles to be evaluated by the customer or the dealer for a particular deal.

The client system 110 may subsequently transmit a request for the results to be sorted by alternative or additional criteria, and the booking module 170 can then respond with a re-sorted set of results. The user of the client system 110 may also revise the criteria and submit a new search request from the client system 110 to the booking module 170, in which case the search and filtering process by the ranking module 174 is repeated so that a new set of sorted results can be transmitted to the client system 110. In some implementations, a loan value is not initially obtained from a lender system 195; instead, a loan value may be directly input by the user at the client system 110, and altered like other criteria of the search request.

This process is further illustrated in FIG. 10. At 810, the deal processing system 150 receives and submits application data to the lender systems 195 at 810. Approval results, including loan amounts, are received at 815 from the lender systems 195. At 820, the deal processing system 150 receives search request parameter values 820. In the implementation described above, the data repository 176 in the deal processing system 170 is then queried using the parameter values at 825, and the result set is received at 830. The result set is filtered at 825 using the loan value from the approval result at 835. The filtered set is then sorted according to ranking value and presented to the client system 110 in a user interface at 850. Prior to presentation, the filtered results can be also sorted according to other desired parameters or other vehicle characteristics. Further, the result set, once sorted according to ranking value, can be truncated according to a defined count value (e.g., top ten results starting with the highest ranking value in the filtered set) prior to presentation at the client system 110. The count value can be altered to present a different number of vehicles in the sorted, filtered set. In this manner, the result set that is presented in the user interface excludes those vehicles for which the client cannot obtain a loan and is further ranked in order of ranking value.

In an alternate implementation, once the search request parameter values are received at 820, the query of the data repository 160 is carried out at 840 using both parameter values and the bank loan values, where only those records having bank loan values less than or equal to the approved loan amount are retrieved from the data repository at 845. The resultant data set can then be sorted according to ranking value and presented in a user interface at 850.

In these examples, the result set that is delivered to the client system 110 is efficiently reduced only to those vehicles that are most likely to result in a successful deal. The customer and/or dealer may then proceed to investigate candidate vehicles for a deal in a more efficient manner, since the results have been restricted to vehicles with likely achievable financing.

As suggested above, the booking value generally determines the likely success of a financed deal. The foregoing ranking methodology improves efficiency by identifying, in the library of vehicles, the most likely candidates for successful financing according to a loan approval amount and the ranking value; this is effectively used as a proxy for the actual booking value of a vehicle. In further embodiments, given a prior approval from a lender with a known bank loan value multiplier to compute the booking value, the known multiplier can then be applied to the bank loan values for the vehicles in the initial result set to identify a booking value for comparison to the loan amount, to further refine the result set.

Figure 11:
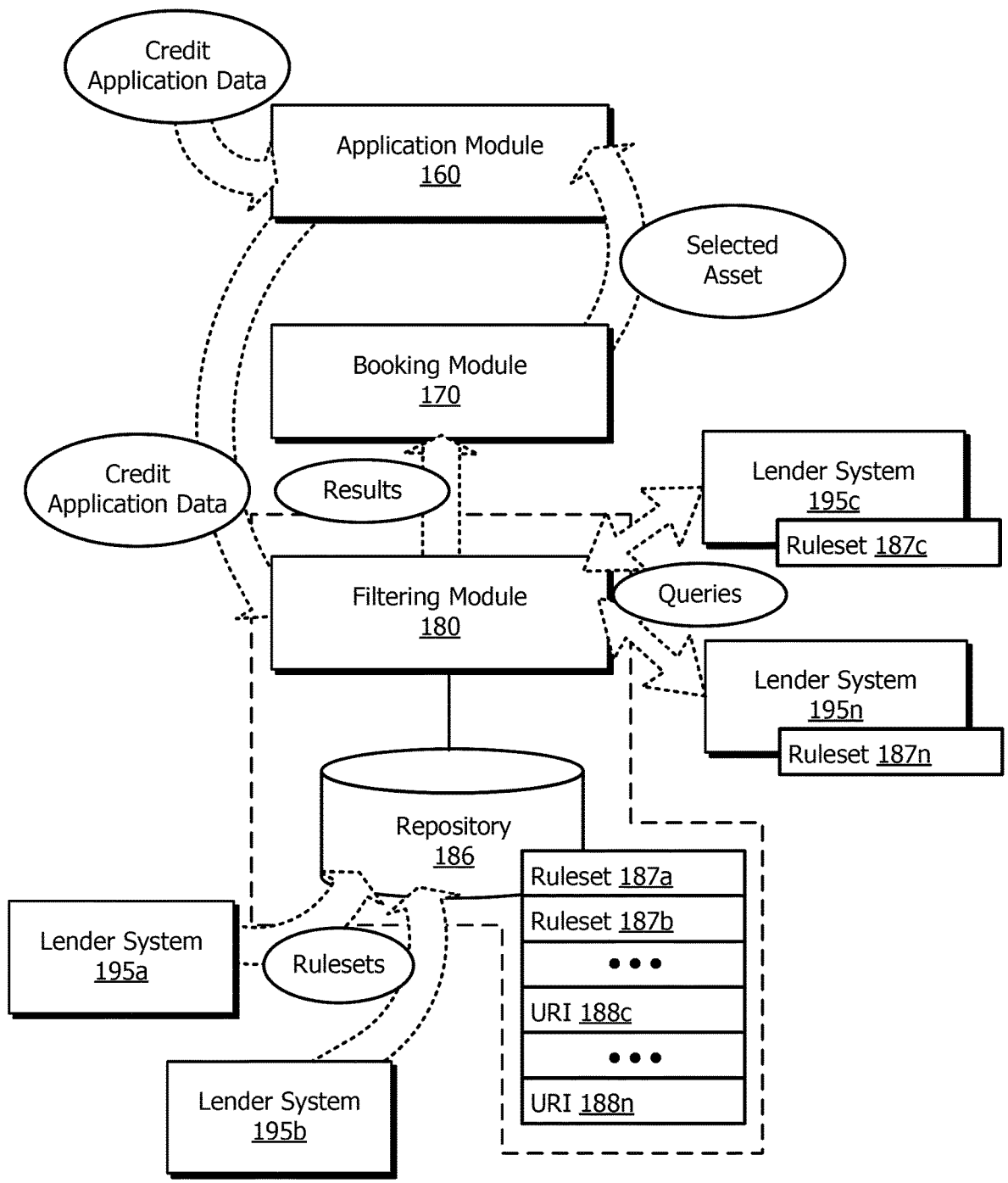
FIG. 11 is a schematic illustrating data flow between various components of the deal processing system when a distributed filtering operation is employed.

As mentioned above, multiple lending systems 195 may be queried with credit applicant data from a customer in order to obtain approvals prior to searching the data repository 160 for suitable vehicles. However, the process of submitting multiple credit applications to multiple vendors increases the inefficiency of the approval process and the transaction overall. Therefore, where possible, the filtering system 180 is employed to apply rulesets on behalf of at least some lending systems 195 and to query other lending systems 195 to accelerate the approval process. The interaction of the filtering system 180 with lending systems 195 and the other components of the deal processing system 150 is illustrated in FIG. 11. As discussed above, credit application data for a given customer is received by the application module 160. It can be stored securely in the application module's data repository (not illustrated in FIG. 11). The credit application data is transmitted by the application module 160 to the filtering module 180. Alternatively, the client system 110 may transmit a request for the filtering module 180 to retrieve the customer's credit application data from the application module 160. The filtering system 180 also obtains, from at least one lender system 195a, 195b, rulesets 187a, 187b respectively, containing application processing or filtering rules to be applied by the rules engine 184 of the filtering module 180 on behalf of the lender system 195a, 195b. These rulesets 187a, 187b are stored in the ruleset repository 186. The rulesets 187a, 187b may be transmitted to the filtering system 180 by the lender system 195a, 195b using any suitable method. For example, an operator at the lender system 195a may securely connect to the filtering system 180 over the Internet to upload its rulesets for storage in the repository 186, and to update the rulesets from time to time.

When credit application data for a customer is received, the rules engine 186 of the filtering system 180 executes the ruleset corresponding to each participating lender system 195a, 195b to obtain a result. Execution of the ruleset processes information in the customer's credit application to obtain an approval or rejection result. A rejection result may comprise one or more reasons for rejection, and an approval result comprises a set of one or more filter rules and/or values, including at least one loan approval amount. A filter value is a value that is used by the booking module 170 in order to filter selected vehicles available for purchase. A filter rule comprises a conditional statement that can be executed against a selected vehicle in order to generate a filter value. The ruleset may comprise a series of Boolean expressions and/or other conditional statements that are executed against the credit application data to determine whether the customer is sufficiently creditworthy to merit a loan approval according to the lender's lending program, and if so to output the maximum value of a loan approval, and terms on which the approval depends. The operators and conditions can take into account, for example, the customer's (and optionally customer's spouse's) financial information, including credit and bankruptcy history, past delinquencies, percentage of credit utilization, highest credit limit to date, and so on; applicable interest rates; the lender's legal fees and service fees; referral fees payable to a dealer; and multipliers used to assess the affordability of a loan to the customer. In some implementations, the output may comprise a further set of rules defining values that are conditional on the characteristics of the vehicle subsequently selected by the customer. For example, a lender may be prepared to approve different maximum loan terms depending on the vehicle model (a newer model may be given a longer loan term than an older model, or a vehicle with more mileage may be given less favourable terms than a vehicle with less mileage). Accordingly, the output may then comprise conditional statements defining different loan approval amounts, or other different approval terms, based on specified vehicle criteria. In other words, a customized or tailored set of rules may be generated by the filtering module 180 in dependence on the submitted customer credit application data. It should be noted that a single lender may have multiple lending programs, and accordingly may provide and use multiple rulesets.

An approval result for a given ruleset will include one or more filter values, which can include a loan approval amount, interest rate, optionally a dealer reserve or referral fee value, and one or more scores computed for the customer; and optionally one or more filter rules, which can be used by the booking module 170 to generate filter values. The loan approval amount may be expressed as a single value representing the maximum amount the lender is willing to finance, or alternatively as a maximum periodic payment and maximum payment term (e.g., a maximum approved monthly payment and maximum term or number of months). A maximum amount to finance typically includes costs associated with taxes, warranties, and other costs associated with a vehicle purchase. The score comprises one or more numeric values that are fixed in the ruleset 187a, 187b for the lender's lending programs, and are selected based on parameters selected by the lender, such as an application score computed according to a proprietary algorithm or conventional credit score. In one example, a ruleset may assign a score of 0.9 to a customer having an application score between 196 and 234, and a score of 1.1 to a customer having an application score between 234 and 272. The score is used as a multiplier to assess a booking value for a vehicle and can be generally representative of a range of credit or application scores computed by a credit bureau or lender; thus, the score assigned by the ruleset may have a range between about 0 and 2, which corresponds to percentage values of 100% to 200%, with less risky customers receiving a greater score. The ruleset may also assign multiple scores to a customer depending on the lending program and policies of the lender, and allowances that the lender is willing to provide (e.g., a lender may allow a multiplier of 1.8 or 180% of the Black Book value as the maximum amount to finance, and a multiplier of 1.4 or 140% for the Black Book as the maximum vehicle sale price.

An approval result may still be conditional, for example contingent on the customer putting a certain payment down on the vehicle, providing proof of income, and so on. However, it should be noted that the fact of the credit application passing the filter (i.e., meeting the conditions of the ruleset) does not necessarily mean that an approval from that lender has been received or is guaranteed, but may only comprise an indication that the lender is suitable for the customer, and that an approval on the terms specified is likely; a formal application to the lender may not occur until a specific asset has been identified.

Those skilled in the art will appreciate that the process of scoring of customer credit applications is generally maintained in confidence by lenders. While the filtering module 180 may include security rules that prevent unauthorized personnel from accessing the rulesets in the repository 186, and permitting them to only see the approval or rejection result, the filtering module 180 is also configured to permit distributed processing of rulesets by lender systems 195a-n. As can be seen in FIG. 1, other lender systems 195c, 195n store their own rulesets 187c, 187n locally at the lender system. The lender systems 195c, 195n are therefore responsible for processing application data received from the filtering system 180 and returning the results, including the one or more filter values and/or rules and scores described above. Access to the ruleset processing functionality may be exposed by the lender systems 195c, 195n via application programming interfaces (APIs). Pointers to or addresses (e.g., uniform resource indicators or URIs) 188c, 188n for these APIs may be stored in the ruleset repository 186. Thus, when the filtering module 180 receives customer credit application data, in addition to causing the rules engine 184 to process the application data against rulesets 187a, 18b stored in the ruleset repository 186, the filtering system 180 also queries the lender systems 195c, 195n with the application data using the APIs, and receives the filter values and/or rules and one or more scores in return. Thus, processing of the customer's credit application can be entirely handled by the filtering module 180, or alternatively distributed at least in part to remote lender systems 195.

Figure 12:
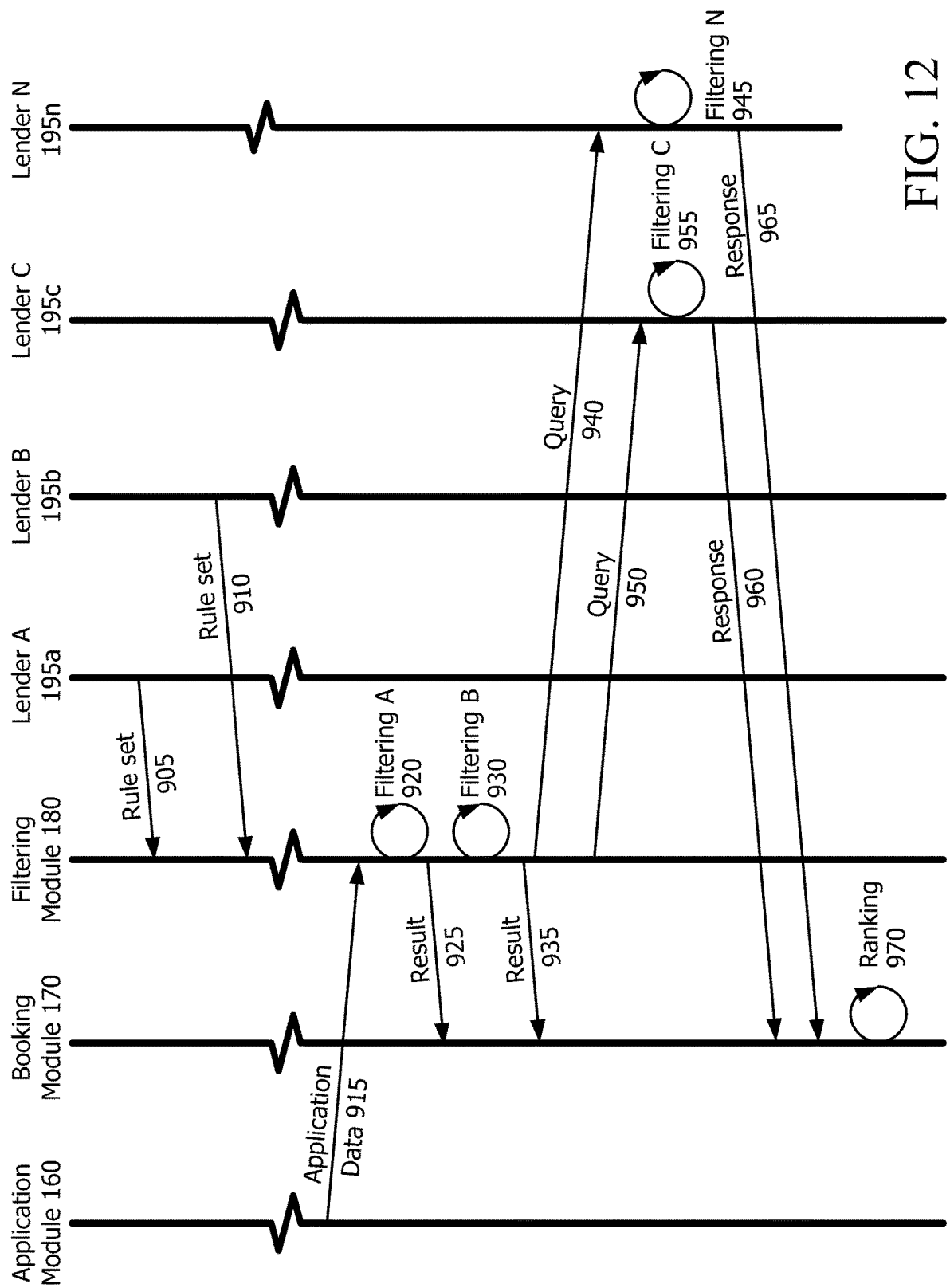
FIG. 12 is an interaction diagram illustrating data flow within the deal processing system when the distributed filtering operation is employed.

FIG. 12 is an interaction diagram illustrating the population of the filtering module 180 with lender rulesets, and the partially distributed execution of rulesets in response to receipt of a customer credit application. Lender systems A and B 195a, 195b transmit rulesets in transmissions 905, 910 to the filtering module 180. The filtering module 180 stores the rulesets in the repository 186 (not shown in FIG. 12). The rulesets may be stored at any time prior to processing a customer application, which is received in transmission 915 by the filtering module 180 from the application module 160. The rules engine 184 is invoked, which queries the ruleset repository 186 for any rulesets to execute. In this example, the ruleset repository 186 stores pointers or addresses for lender systems C and N 195c, 195n. Accordingly, the rules engine 184 of the filtering module 180 executes the rulesets 187a, 187b retrieved for lender systems A and B against the received customer application data at 920, 930, respectively. The corresponding approval or rejection results 925, 935 obtained from executing these rulesets are returned to the query processor 182. The rules engine 184 retrieves the pointers 188c, 188n for lender systems C and N, and returns these to the query processor 182. The query processor 182 then initiates queries 940, 950 including application data to the lender systems N and C 195n, 195c, which execute their own stored rulesets at 945, 955 respectively, to obtain approval or rejection results. These results, along with any filter values and/or rules and scores, and other conditions of a loan approval, are transmitted back to the filtering module 180 in responses 965, 960. The filter engine 184 may concurrently execute its stored rulesets against the application data, rather than sequentially as illustrated in FIG. 12. As noted above, a given lender may have multiple rulesets corresponding to different lending programs, which may be stored in the repository 186 or at the lender system, with a corresponding pointer stored in the repository 186.

All of the filter values and/or rules and scores, and accompanying conditions, are thereafter transmitted from the filtering module 180 to the booking module 170. In some implementations, the results including the filter values/rules, scores, and conditions may be transmitted to the client system 110 as well for the customer or vendor to download and store offline. For example, the approval results may be stored locally in the client system 110, or stored in removable media (e.g., a USB key, smart card, or other device). If the approval results are stored in this manner, they may include an expiry date, such as 30 days from the date of the result.

Figure 13:
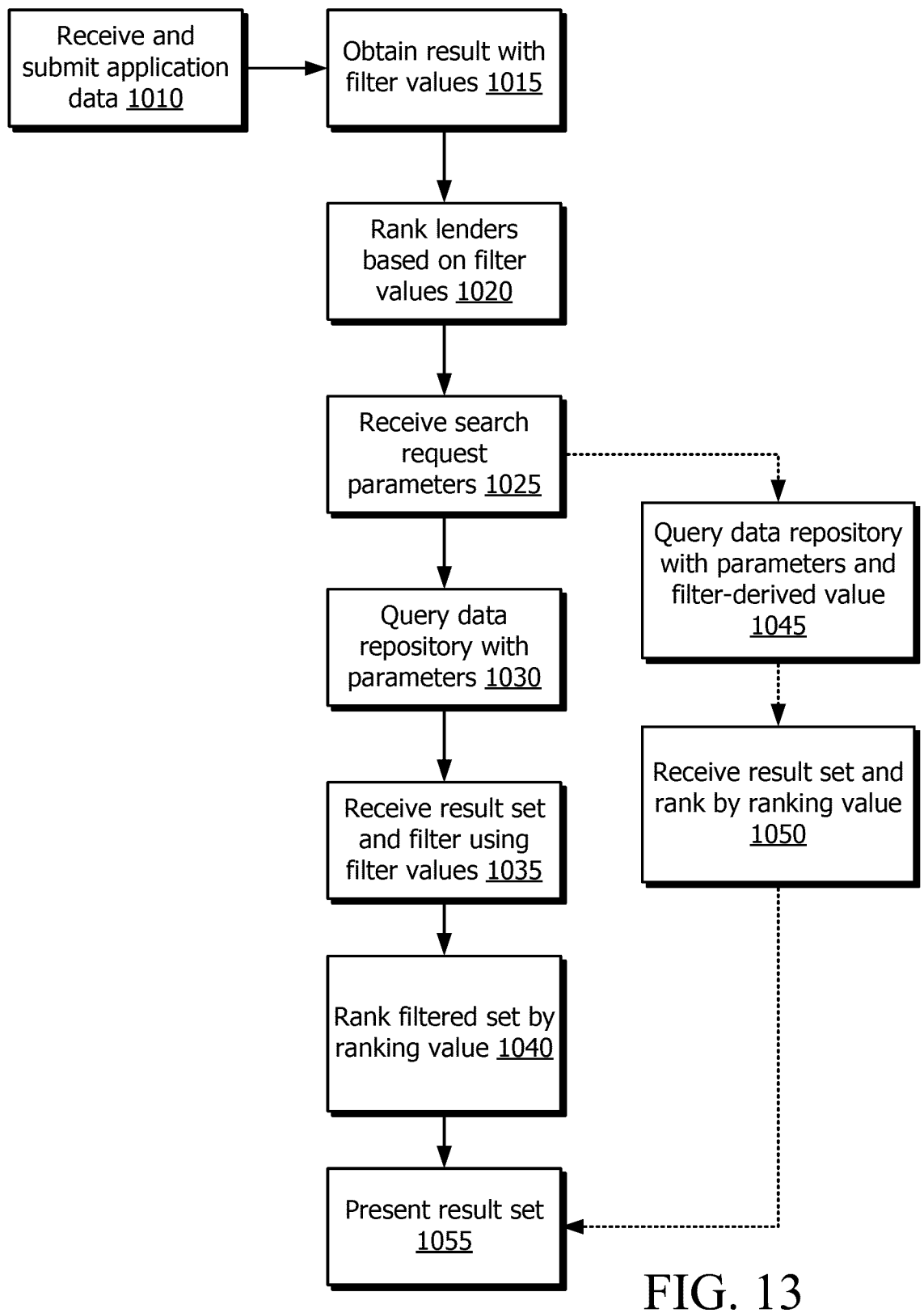
FIG. 13 is a flowchart of a further retrieval and sorting process executed by the deal processing system.

FIG. 13 is a flowchart illustrating the high-level process for implementing a search for a vehicle using the booking module 170 and filter values and/or rules computed as described above with reference to FIGS. 11 and 12. At 1010, application data is received from a client system 110, either directly from a prospective customer or from a dealer, for example. This data is received by the deal processing system 150 and provided to the filtering module 180, which transmits the data as required to external, remote lending systems 195 to obtain filter values/rules and scores, and/or provides the data to its own query processor and engine 182, 184 to obtain filter values/rules and scores at 1015. These filter values, as discussed above, can include the (conditionally) approved loan amount, which can be expressed as a total amount or alternatively as a maximum approved periodic payment amount (e.g., monthly payment amount) and total term (e.g., number of months); as well as interest rate, and other data related to a loan transaction. The scores computed by the rulesets executed either locally (at the filtering module 180) or remotely (by lender systems 195) are also returned. These results are provided to the booking module 170.

At 1020, the booking module 170 ranks the lending programs of the lender systems 195, optionally based on the filter values or score received for each program and/or system. For example, the lenders or their programs (referred to below as simply "lenders") may be ranked in descending order according to the approved loan amount or according to score, with the greater values being more preferred. Alternatively, the lenders may be ranked according to other preferences. For instance, if the client system 110 is operated by a dealer, the lenders may be ranked in order of decreasing dealer reserve value. From the ranking of lenders, a particular lender (e.g., the top-ranked lender) is selected.

Search request parameters or criteria are received by the booking module 170 from the client system 110 at 1025. These criteria, as mentioned above, can include keywords (e.g., freeform text for use in searching), as well as selections of vehicle characteristics that may be stored in the data repository 176. The data repository 176 is queried at 1030 with the search request criteria, and a result set is received at and filtered at 1035. The filtering at 1035 applies at least one of the filter values received by the selected lender; and where the result for the selected lender includes filter rules, the filtering comprises executing the rules against the appropriate vehicle characteristics of the vehicles in the result set in order to generate the filter values, so that a particular filter value can be applied against the result set. The applied filter value may be, for example, the approved loan amount; all vehicles having a sale price that would result in the total cost of the vehicle purchase to the customer (e.g., after taking into account trade-in values, and costs to the customer that would be included in the loan amount, such as dealer and lender fees, credit insurance fees, vehicle licensing fees, taxes, etc.) exceeding the approved loan amount are filtered out. The filtered set is then ranked according to the ranking values 1040 obtained from the data repository 176, or otherwise computed on demand as mentioned above. The ranked, filtered set is then presented at a user interface to the customer or dealer at the client system 110 at 1055.

In an alternative method, after search request criteria are received at 1025, the data repository 160 is queried at 1045 with both the criteria and a filter-derived value, such as the approved loan amount. This eliminates the subsequent filtering step at 1035 described above. The result set of data is then ranked according to ranking value at 1050, as described above, and the result set is then presented to the user at 1055. As noted above, a search request may not include any criteria; in that case, the results returned will only employ a selected filter-derived value such as approved loan amount to produce a result set, which can then be sorted according to ranking value or another value. If multiple similar results are obtained (for example, there may be several instances of a current-year vehicle model offered for sale by a number of dealers at the same list price), the multiple similar results may be presented visually to the customer as a single result in the result set.

Thus, at the client system 110, a ranked set of vehicles matching the customer's stated search criteria, as well as the customer's financial position, is presented for the selected lender. At the client system, the customer or dealer may thereafter select another one of the lenders that was previously ranked, and re-query the data repository 176 with the filter values associated with the other lender. Ranked sets of vehicles may thus be obtained for every lending program for which the customer obtained an approval result. The ranked sets of vehicles may be further sorted according to other parameters. Alternatively, a customer or dealer may select a given vehicle in the result set, and request a ranking of lenders offering terms suitable for the selected vehicle based on the filter values and scores already obtained from the lenders.

It will be appreciated from the foregoing specific example that the operation of the filtering module 180 and the booking module 170 effectively provides for a distributed filtering system that permits both efficient and secure processing of search or filtering criteria to facilitate a search of a database or other data repository for an asset record or other data item. The filtering module 180 stores sets of rules corresponding to one or more filtering entities (lenders, in the above example) and executes these rules against a set of input data obtained from a user (the customer application data) to identify qualified or matching filtering entities; depending on the content of the conditional statements in the rules and the input data, some filtering entities may filter themselves "out" of the process. Where a filtering entity does not wish to store its rules on the filtering module 180, the filtering module 180 can also store pointers to the filtering entity's own computer system and send the input data to those systems in order to permit the filtering entity to execute its own rules against the input data. The sets of rules, in these embodiments, may comprise executable code containing the conditional statements. The outcome of the rules execution can comprise a set of filter values based on the input data, and/or a further set of rules (which may be provided as executable code) that can be executed against further input data in order to generate filter values.

With the filter values or rules, a user can query a database or other repository of data using the booking module 170 for records of assets having characteristics and/or sale values corresponding to at least one criterion in the user's search request. The at least one criterion may include a filter value previously obtained for the user, as well as, optionally, another criterion specified by the user. In this way, the query is targeted towards a set of results that are more likely to meet not only the user's requirements, but also the filtering entity's specifications. The results of the query may then be sorted according to characteristics of the assets prior to presenting the resultant set to the user.

Figure 14A:
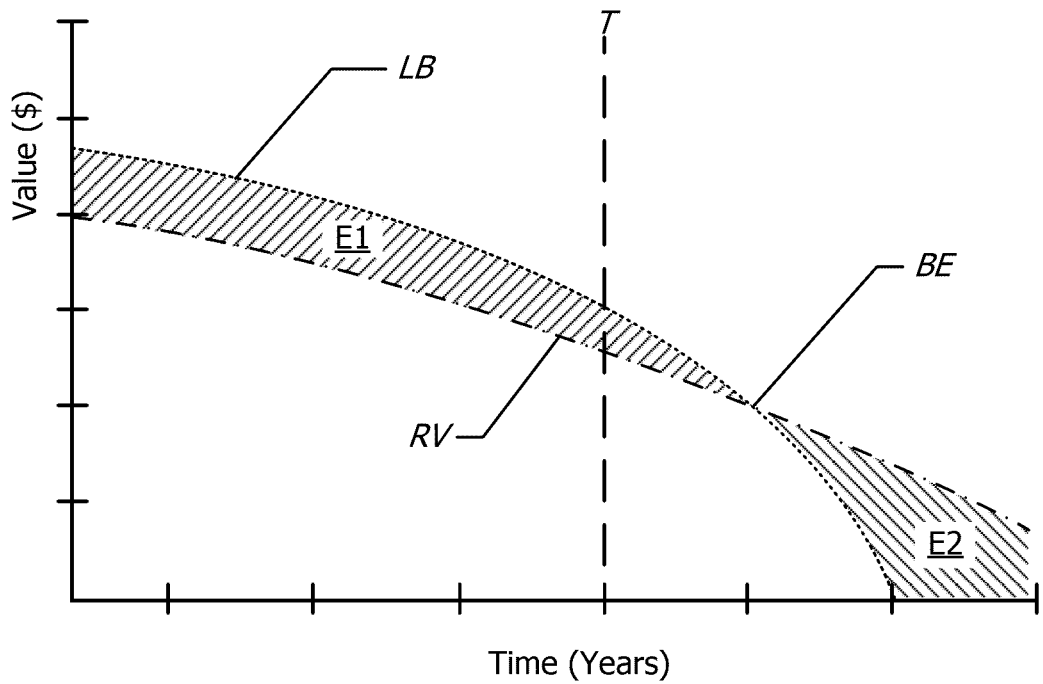
FIGS. 14A and 14B are schematics illustrating the computation of a break-even point for use in sorting processes.
Figure 14B:
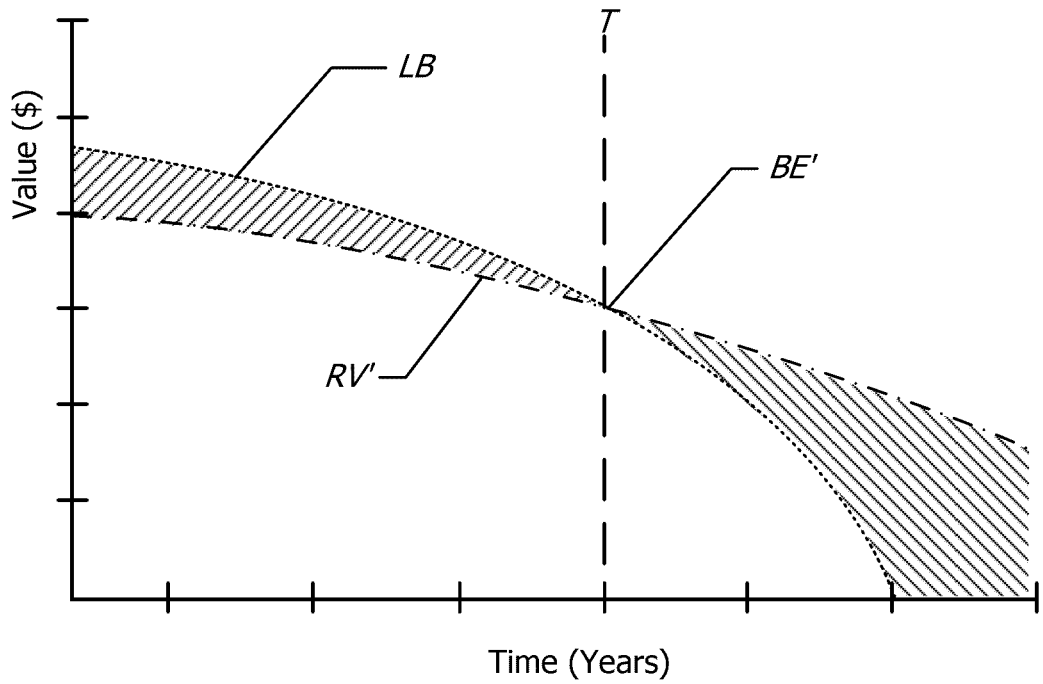

In addition or alternatively, the vehicles can be filtered and ranked according to their respective equity positions based on the terms of the lending programs for which approval was received. The concept of equity position is illustrated in the graphs of FIGS. 14A and 14B. It should be noted that the graphs in these figures are not to scale, but are intended only to show the general trend in equity values in certain conditions. FIG. 14A illustrates the difference between the quantum of the balance of a loan, LB, and the residual value of a vehicle, RV, taking into account depreciation and optionally deterioration of vehicle condition, over time. LB may be computed based on the filter values provided with an approval result (e.g., approved loan amount, interest rate, minimum payment amount or maximum payment term), while R V may be determined from the asset data stored in repository 176. Both LB and RV are expected to decrease over time, and eventually reach a zero value, or a lowest value in the case of RV (since some vehicles may always have a residual non-zero value). For the customer to reach a neutral or positive equity position, the residual value of the vehicle must be equal to or exceed the outstanding loan balance. In a case where the initial loan amount exceeds the initial value of the vehicle, as in FIG. 14A, at some point the curves LB and R V must intersect. This point may be considered the "break-even" point BE, and in FIG. 14A occurs prior to the end of the term of a loan covering the full cost of the vehicle (i.e., where LB reaches zero). Thus, in FIG. 14A, region E1 illustrates that the customer is in a negative equity position; region E2 is a positive equity position. The value of the equity at a given point in time can be determined by subtracting the value of RV from LB.

However, depending on the term of ownership T, the customer may not reach BE by the time T is reached. The term of ownership T may be the same as the term of the loan, or may be longer or shorter than the loan term. In the example of FIG. 14A, T occurs before BE, so the customer would still be in a negative equity position. If at that point the customer wishes to purchase another vehicle, obtaining financing may be more difficult. Indeed, the example of FIG. 14A is not the worst case scenario, as the vehicle may depreciate faster than indicated by RV.

To optimize the customer's equity position, it would be preferable to select a vehicle with a rate of depreciation that permits a customer with an initial loan amount greater than the initial vehicle value to reach the break-even point by the time the customer's desired T occurs. An example is illustrated in FIG. 14B, in which the magnitude of the slope of R V is less than that of RV in FIG. 14A, resulting in break-even point BE' being achieved at time T. An earlier BE' may also be obtained by altering the slope of LB (not shown in the figures); or, in other words, selecting a different lending program with different terms that will produce this result.

From the foregoing discussion, it will be appreciated that the position of the break-even point BE in time may be determined by the booking module 170 from the filter values received from a lender for a given vehicle; once a vehicle is identified, its RV over time may be determined using data retrieved from the data repository 176 or from another source (e.g., from a query to a reference system 192), and the LB over time can be determined from filter values obtained for the selected lender. The applicable equations for determining LB are known in the art. The values available to determine RV may only be approximate, and may not be sufficient to compute the slope of the RV curve accurately, but those skilled in the art will appreciate that a sufficient approximation may be made. The booking module 170 can then determine whether the time associated with the BE, $BE_T$, is less than or equal to the proposed term T, as determined from the filter values. The T value can be received by the booking module 170 as part of the search request input by the user; a default T value may be applied (e.g., a typical length of ownership) if no T value is received with the request. If $BE_T$ is greater than the proposed term T, then the vehicle may not be considered to be suitable for the customer, and can be filtered out of the result set by the booking module 170. The customer may revise the search parameters by adjusting the proposed term T, which can result in fewer or additional vehicles being filtered out of the result set. Alternatively, the periodic loan payment amounts may be adjusted (e.g., shorter loan term and higher payments) and BE recalculated until $BE_T$ is less than or equal to the proposed term of ownership T. The payment amounts, however, may be limited to a maximum payment amount determined by the filter values. As part of the result set data presented to the user, the booking module 170 may generate graphics illustrating the relative values of RV and LB, and the positions of T and BE, similar to the illustrations in FIGS. 14A and 14B.

In a further implementation the computation of $BE_T$ and comparison to T may be made for every vehicle initially obtained in the result set for a given set of lender filter values, and the result set ranked from lowest to highest $BE_T$ (i.e., how quickly the break-even point is obtained) or highest to lowest $T-BE_T$ (i.e., length of period of time the customer spends in a non-negative equity position with respect to the vehicle).

Once a result set is presented to the user, however ranked, the result set, along with approvals, may be stored locally in the client system 110, or stored in removable media as described above. Again, the stored information can include an expiry date, such as 30 days from the date of the approval result or search. After the data is stored, it may be subsequently transmitted or provided to a dealer or lender to facilitate conclusion of a transaction for a given vehicle, based on the approval result obtained from the lender.

The booking module 170 may be available for use even in those cases where customer application data is not obtained using the application module 160, or approval results are not obtained using the filtering module 180. For example, lender filter values may be input by a user via a user interface and received by the booking module 170 so that searches and filtering of result sets of vehicles can be carried out as described above, without engaging the filtering module 180. The lender filter values may have been obtained "offline" by the customer or vendor accessing the booking module 170, for example by facsimile, email, or another means.

The examples and embodiments are presented only by way of example and are not meant to limit the scope of the subject matter described herein. Variations of these examples and embodiments will be apparent to those in the art, and are considered to be within the scope of the subject matter described herein. For example, some steps or acts in a process or method may be reordered or omitted, and features and aspects described in respect of one embodiment may be incorporated into other described embodiments. As another example, the client systems 110 and the functions of the other modules can alternatively be integrated at a single site. In that case, certain components illustrated and described above may not be required; for example, components such as the gateway 154 and web server 158 may not be needed, and the authentication service 156 may be optional as well. Furthermore, the inventive concepts described herein may be directed to other endeavours; for example, the concepts described above may apply to a lease transaction rather than a purchase and sale.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein. Further, while this disclosure may have articulated specific technical problems that are addressed by the invention(s), the disclosure is not intended to be limiting in this regard; the person of ordinary skill in the art will readily recognize other technical problems addressed by the invention(s).

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

The invention claimed is:

1. A computer system for obtaining information about a set of assets, the computer system comprising:
   at least one processor and associated memory and communication subsystems, the computer system being configured to:
   obtain, for a customer, a set of one or more filter values from each of a plurality of filtering entities, the filter values comprising at least one term and at least one score corresponding to the at least one term;
   select a filtering entity from among the plurality of filtering entities, based on a highest score of the scores obtained for the plurality of filtering entities;
   query a first data repository storing corresponding characteristics and sale values for the plurality of assets to identify a set of assets corresponding to at least one criterion specified in a search request, the at least one criterion comprising a value determined at least in part from the at least one term for the selected filtering entity of the plurality of lending entities;
   sort the assets of the set of assets according to a ranking value determined using the sale value and a reference value for each asset stored in a second data repository; and send information about the sorted set of assets to a user interface.

2. The computer system of claim 1, further comprising a second computer system comprising at least one processor and associated memory and communication subsystems, the second computer system being configured to:
   store, in a ruleset repository, either a ruleset to be executed on behalf of the filtering entity or a pointer to an interface operated remotely by the filtering entity;
   when a ruleset for a filtering entity is stored in the ruleset repository, execute the ruleset against customer data obtained for the customer to obtain the one or more filter values;
   when a pointer for a filtering entity is stored in the ruleset repository, send the customer data to the interface, and receive the one or more filter values in response.

3. The computer system of claim 2, wherein a pointer for each of the plurality of filtering entities is stored in the ruleset repository.

4. The computer system of claim 1, wherein the set of assets is further sorted according to at least one term of the filter values obtained for the selected filtering entity.

5. The computer system of claim 1, wherein the first data repository and the second data repository are the same.

6. The computer system of claim 1, wherein the computer system is further configured to select the selected filtering entity from among the plurality of filtering entities, the selecting being determined based on the at least one term obtained for each of the plurality of filtering entities.

7. The computer system of claim 1, wherein the at least one criterion further comprises at least one characteristic.

8. The computer system of claim 1, further configured to:
   receive a selection of a different filtering entity of the plurality of filtering entities;
   alter the at least one criterion to comprise a value determined at least in part from the at least one term of the different filtering entity;
   re-query the first data repository to identify a further set of assets corresponding to the at least one criterion;
   sort the assets of the further set of assets according to the ranking value determined using the sale value and a reference value for each asset; and
   send information about the sorted further set of assets to a user interface.

9. A method implemented by a computer system comprising at least one processor, associated memory, and communication subsystems, the method comprising:
   obtaining, by the at least one processor, a set of one or more filter values for a customer from each of a plurality of filtering entities, the filter values comprising at least one term and at least one score corresponding to the at least one term;
   selecting a filtering entity from among the plurality of filtering entities, based on a highest score of the scores obtained for the plurality of filtering entities;
   querying, by the at least one processor, a first data repository storing corresponding characteristics and sale values for the plurality of assets to identify a set of assets corresponding to at least one criterion specified in a search request, the at least one criterion comprising a value determined at least in part from the at least one term for the selected filtering entity of the plurality of lending entities;
   sorting, by the at least one processor, the assets of the set of assets according to a ranking value determined using the sale value and a reference value for each asset stored in a second data repository; and
   presenting, by the at least one processor, information about the sorted set of assets in a user interface.

10. The method of claim 9, wherein the at least one criterion further comprises at least one characteristic.

11. The method of claim 9, further comprising sorting the set of assets according to one of the at least one term obtained for the selected filtering entity.

12. The method of claim 9, wherein obtaining the set of one or more filter values comprises the at least one processor:
   for each of the plurality of filtering entities, obtaining either a ruleset to be executed on behalf of the filtering entity or a pointer to an interface operated remotely by the filtering entity;
   when a ruleset is obtained, executing the ruleset against customer data obtained for the customer to obtain the one or more filter values;
   when a pointer is obtained, sending the customer data to the interface, and receiving the one or more filter values in response.

13. The method of claim 12, wherein a pointer is obtained for each of the plurality of filtering entities.

14. The method of claim 12, wherein rulesets to be executed on behalf of the filtering entities are stored in a third data repository.

15. The method of claim 9, further comprising the at least one processor:
   receiving a selection of a different filtering entity in the user interface;
   altering the at least one criterion to comprise a value determined at least in part from the at least one term of the different filtering entity;
   re-querying the first data repository to identify a further set of assets corresponding to the at least one criterion;
   sorting the assets of the further set of assets according to the ranking value determined using the sale value and a reference value for each asset; and
   presenting information about the sorted further set of assets in a user interface.

16. The method of claim 9, wherein the plurality of filtering entities comprise a plurality of lenders.

17. The method of claim 16, wherein the at least one term comprises a maximum loan approval amount.

\* \* \* \* \*